US012277218B2

(12) United States Patent
Braggs et al.

(10) Patent No.: US 12,277,218 B2
(45) Date of Patent: Apr. 15, 2025

(54) MANAGING AND CLASSIFYING COMPUTER PROCESSES

(71) Applicant: Sophos Limited, Abingdon (GB)

(72) Inventors: Steven John Braggs, Oxford (GB); James Christopher Carpenter, Oxford (GB)

(73) Assignee: Sophos Limited (GB)

( * ) Notice: Subject to any disclaimer, the term of this patent is extended or adjusted under 35 U.S.C. 154(b) by 124 days.

(21) Appl. No.: 17/989,111

(22) Filed: Nov. 17, 2022

(65) Prior Publication Data
US 2024/0169056 A1    May 23, 2024

(51) Int. Cl.
  *G06F 21/54*   (2013.01)
  *G06F 21/55*   (2013.01)
  *G06F 21/56*   (2013.01)

(52) U.S. Cl.
  CPC ............ *G06F 21/54* (2013.01); *G06F 21/554* (2013.01); *G06F 21/565* (2013.01)

(58) Field of Classification Search
  CPC ....... G06F 21/54; G06F 21/554; G06F 21/565
  See application file for complete search history.

(56) References Cited

U.S. PATENT DOCUMENTS

| 2017/0235967 A1* | 8/2017 | Ray | G06F 21/56 713/165 |
| 2019/0081963 A1* | 3/2019 | Waghorn | G06F 21/552 |

\* cited by examiner

*Primary Examiner* — Kristie D Shingles

(74) *Attorney, Agent, or Firm* — Schmeiser, Olsen & Watts LLP; Timothy P. Collins, Esq.

(57) ABSTRACT

In a system and method for processing computer system events asynchronously for software security operations, a computer memory is configured for a read operation by a computer process. The computer process loads, based on a first event occurring during the read operation, at least one file in the computer memory. At least one thread of the computer process is generated. An execution of the at least one thread of the computer process is delayed based on a second event occurring after the first event. A security operation is performed on the process contemporaneously with the loading of the file in the computer memory and the blocking of the execution of the at least one thread of the computer process. The process is either un-delayed on completion of the previous security operation or other security operations performed on that process.

20 Claims, 6 Drawing Sheets

MANAGING AND CLASSIFYING COMPUTER PROCESSES

FIELD

The present disclosure relates generally to computer security software. More specifically, the present disclosure describes malicious software detection techniques including the asynchronous processing of computer operation system events.

BACKGROUND

When a computer program is launched, for example, during bootup or other initialization process, the contents of the program are loaded into memory as well as supplemental files, for example, executable binary files, libraries, scripts, instructions, resources, static data files, and so on. A file load requires a read operation, for example, to acquire computer instructions for creating new process threads used to execute computer instructions of the file of interest. A security agent running on a computer may perform a security operation, for example, scanning the file for malware. In doing so, read operations are temporarily blocked thereby preventing load events until the security operation is completed. The resulting serialization of file load events during process initialization can result in computer performance problems.

SUMMARY

According to embodiments disclosed herein are a method, and associated computer system and computer program product for processing computer system events for software security operations. A computer process loads, based on a first event occurring during a process initiation operation, at least one file in the computer memory. At least one thread of the computer process is generated. An execution of the at least one thread of the computer process is blocked based on a second event occurring after the first event. A security operation is performed on the process contemporaneously with the loading of the at least one file in the computer memory and the blocking of the execution of the at least one thread of the computer process. The at least one thread is unblocked after performing the security operation.

BRIEF DESCRIPTION OF THE DRAWINGS

The above and further advantages of the foregoing may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the disclosed concepts and features.

DETAILED DESCRIPTION

Figure 1:
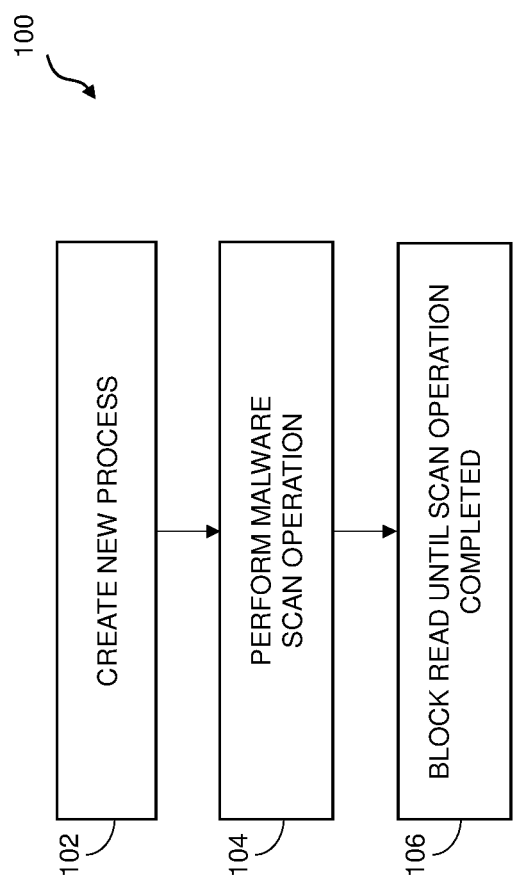
FIG. 1 depicts a conventional method for detecting malicious activity on a computing device, in accordance with an example embodiment.

Reference in the specification to "one embodiment" or "an embodiment" means that a particular feature, structure, or characteristic described in connection with the embodiment is included in at least one embodiment of the teaching. References to a particular embodiment within the specification do not necessarily all refer to the same embodiment.

The disclosed concepts and features are described in more detail with reference to exemplary embodiments thereof as shown in the accompanying drawings. While the various concepts and features are described in conjunction with various embodiments and examples, it is not intended that the concepts and features are limited to such embodiments. On the contrary, the various concepts and features encompass various alternatives, modifications and equivalents, as will be appreciated by those of skill in the art. Those of ordinary skill having access to the concepts described herein will recognize additional implementations, modifications and embodiments, as well as other fields of use, which are within the scope of the present disclosure as described herein.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "approximately" or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

It should also be understood that endpoints, devices, compute instances, or the like that are referred to as "within" an enterprise network may also be "associated with" the enterprise network, e.g., where such assets are outside an enterprise gateway but nonetheless managed by or in communication with a threat management facility or other centralized security platform for the enterprise network. Thus, any description referring to an asset within the enterprise network should be understood to contemplate a similar asset associated with the enterprise network regardless of location in a network environment unless a different meaning is explicitly provided or otherwise clear from the context.

FIG. 1 depicts a conventional method 100 for detecting malicious activity on a computing device, in accordance with an example embodiment.

At block 102, a new process of a running computer program is created by an operating system. For example, in a Windows operating system, a process creation event can log relevant information when a program executes, and new processes are created. The process may load library files, for example, DLLs, into a memory.

At block 104, a security operation can be performed on the computer program. In some embodiments, the scan operation is part of a security operation, for example, an antivirus operation performed by a security agent for detecting malware and so on. For example, a scan operation may include scanning a file to be executed, for example, opened. If the file is opened, malware associated with the file may be executed. If malware is detected, the antivirus software that performed the scan may prevent the malware from being executed, for example, by causing the open operation to fail. In doing so, at block 106, a read operation is blocked until the scan operation is completed. For example, when a process creation event is written to memory, blocking file descriptors will block a read event from occurring until it has written all of the data to the file, resulting in reduced computer performance.

To address the limitations of the method 100 described in FIG. 1, embodiments of the present inventive concepts are directed to systems and methods for processing computer system events, in particular, read, load, and block events, asynchronously so that a security operation such as a security operation such as a malware scan can be performed on computer files, while permitting read and load events related to the computer files to be performed as part of a normal operation instead of the read and load events being blocked while the security operation is performed. Therefore, a plurality of computer programs, related executable files, or the like, for example, DLLs but not limited thereto, can be loaded without waiting for a security operation by a security agent to be completed. In addition, process threads, for example, created for executing computer instructions of a computer file, are temporarily prohibited from an external interaction such as writing to memory, network access, and so on until the security operation is completed. The temporary blocking of process threads from executing with respect to performing writes or the like can occur at later events so that read and load events can occur in a normal manner. Accordingly, the performance of a security operation and file loads and the asynchronous suspension of process thread writes, or the like can increase computer performance.

In addition, by allowing read-only operations to proceed in a monitoring mode, e.g., where the security agent monitors a computer process, the process can be classified. This feature may be useful in identifying files used by the process that are considered to be malicious, for example, by analyzing the features to identify behavioral patterns in injected DLLs. In some embodiments, the process undergoing a security operation can be classified according to the files that are loaded. For example, if the security agent of a computer monitors an executable file, a security agent can determine from that a file of an interpreter that can execute scripts is a possible threat by the classification of the file being loaded. In addition, the classification information of the process can be used in the performance of subsequent security operations. For example, a particular security operation may be performed to remove a process based on the classification.

Figure 2:
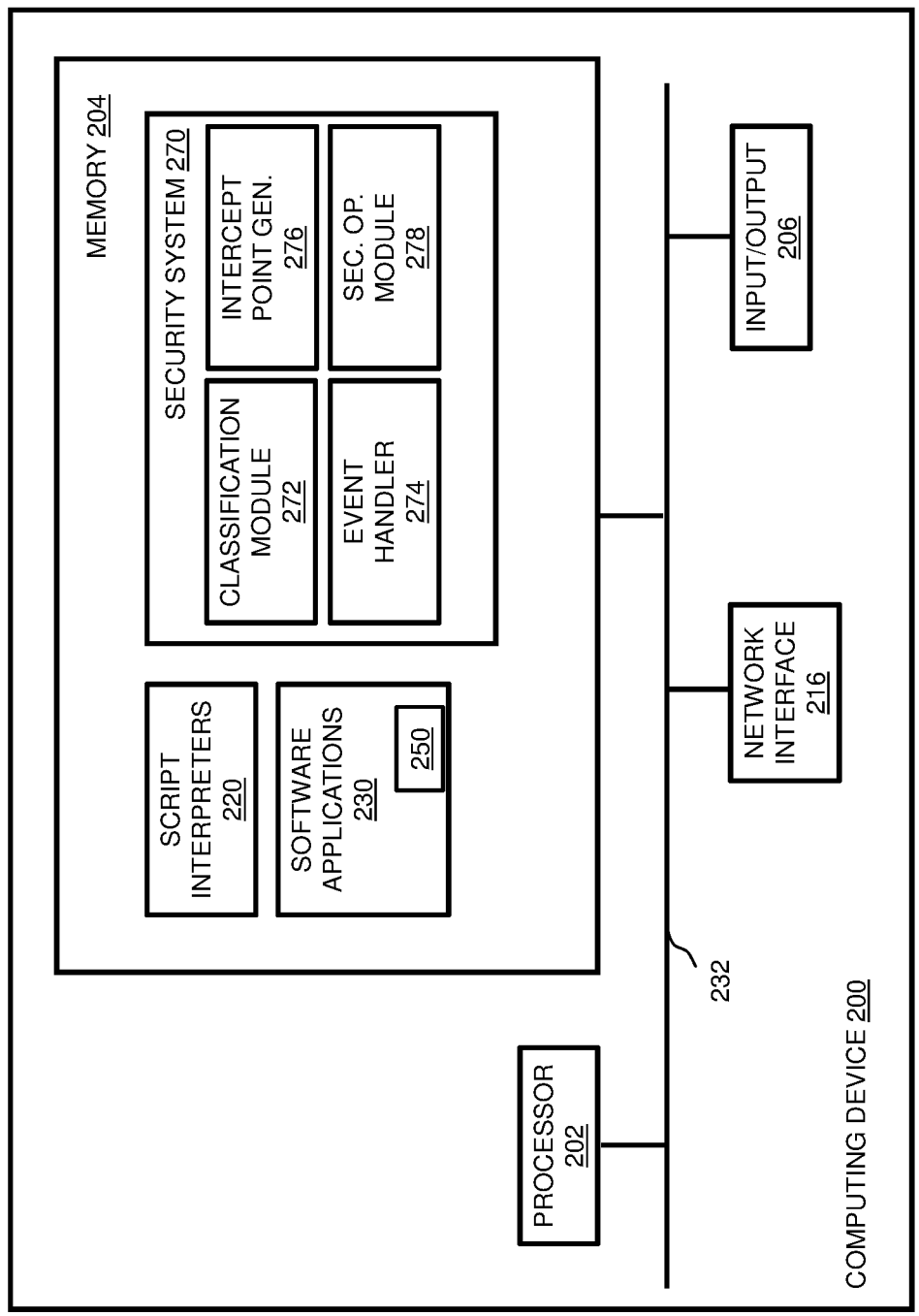
FIG. 2 depicts a block diagram of a computing device, in accordance with an example embodiment.

FIG. 2 is a block diagram of a computing device 200, in accordance with an example embodiment. In general, the computing device 200 may be a hardware-based computing device such as a laptop computer, desktop computer, workstation, server, mobile phone, television, set top box, a wearable computer (e.g., watch, jewelry, or clothing), electronic home device (e.g., a thermostat or a home appliance controller), just as some examples, or any type of network endpoint or endpoints as described herein, e.g., a physical representation of an electronic device deploying the threat management facility 600 with reference to FIG. 6. In some embodiments, the computing device 200 may provide a physical or virtual device as a platform for any of the entities such as a client described in a threat management environment herein with reference to FIG. 6. The computing device 200 may also or instead be any suitable device that has processes and communicates over a network via an input/output (I/O) device 206 such as a transceiver, Ethernet port, WiFi apparatus, or other electronic network communication medium logic. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.), fifth generation cellular technology (e.g., 5G), WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system. The network (not shown) may also include a combination of data networks and need not be limited to a strictly public or private network. Accordingly, the computing device 200 may be without limitation a laptop computer, a desktop computer, a personal digital assistant, a tablet, a mobile phone, a television, a set top box, a wearable computer (e.g., watch, jewelry, or clothing), an electronic home device (e.g., a thermostat or a home appliance controller), just as some examples.

The computing device 200 includes a storage, or memory 204, that can store, for example, code of one or more software applications, modules, programs, or the like includes instructions to cause a processor 202 to perform one or more processes, functions, and/or the like. For example, the memory 204 may store information within the computing device 200 and/or software components that are part of the threat management facility 600 of FIG. 6.

The memory 204 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 204 may, in general, include a non-volatile computer readable medium containing computer code that, when executed by the computing device 200 creates an execution environment for a computer program in question. The processor 202 may be any as described herein and may generally be capable of processing instructions for execution within the computing device 200. The processor 202 may include a single-threaded processor or a multi-threaded processor. The processor 202 may be capable of processing instructions stored in the memory 204 and/or data storage device (not shown).

In some embodiments, the memory 204 may include one or more script interpreters 220, software applications 230, and a security system 270. In some embodiments, one or more of these software components are part of an anti-malware system. In some embodiments, one or more of these software components may be implemented externally to the computing device 200, for example, at other components of the threat management facility 600 of FIG. 6. The memory 204 may also store other components such as kernel drivers (not shown), which detect calls initiated by an interpreter 220 or application 230, managing and tracking processes and threads of the interpreters 220 and applications 230 operating in the user mode, and accessing hardware components of the computing device 200. Other user-mode objects or software components, for example, instead of interpreters, may equally apply with respect to security protection in accordance with embodiments herein.

The interpreter(s) 220 may reside in a user mode of the computer's operating system (not shown). In some embodiments, an interpreter 220 is a common script interpreter that translates content of a script related to an application 230 such as a web browser. In some embodiments, a script can be interpreted and executed within the application 230. Although an interpreter 220 may not be itself malicious, it may be used as a proxy to execute malicious scripts and/or other malware. For example, when executing a script, the interpreter 220 being a compiled program can directly control the computer processor 202 by reading a script file. However, a malicious script may be processed by the interpreter 220 which can harm the computer under the direction of the malicious script. Accordingly, in this example, it may be desirable for the security system 270 to block processes during an operation that includes the launch of a computer program of an interpreter 220 or application 230.

The security system 270 may include a classification module 272, an event handler 274, an intercept point generator 276, and a security operation module 278. In some embodiments, one or more files 250 may be detoured or rerouted so that the event handler 274 of the security system 270 can block the execution of malicious scripts, e.g., a script, or scripts that are non-malicious but used to contribute to a malicious operation, by managing the various events associated with a process initialization, in accordance with some embodiments. For example, the security system 270 can detour a common script interpreter to block the execution of a script that is part of a suspicious object and that invokes an interpreter 220.

In some embodiments, a software application 230 includes elements such as executable files, files, scripts, instructions, resources, static data files, and so on that are loaded into memory. For example, an executable file can include programs that load the files 250 into the memory 204, for example, during a boot operation. An application 230 operating in a user mode can be vulnerable to malware attacks. For example, if a file contains malware, the program the file contains may run, which can execute a malware attack. Accordingly, the security system 270 can block the execution of process threads or the like asynchronously with respect to a read or load event in accordance with some embodiments.

Figure 6:
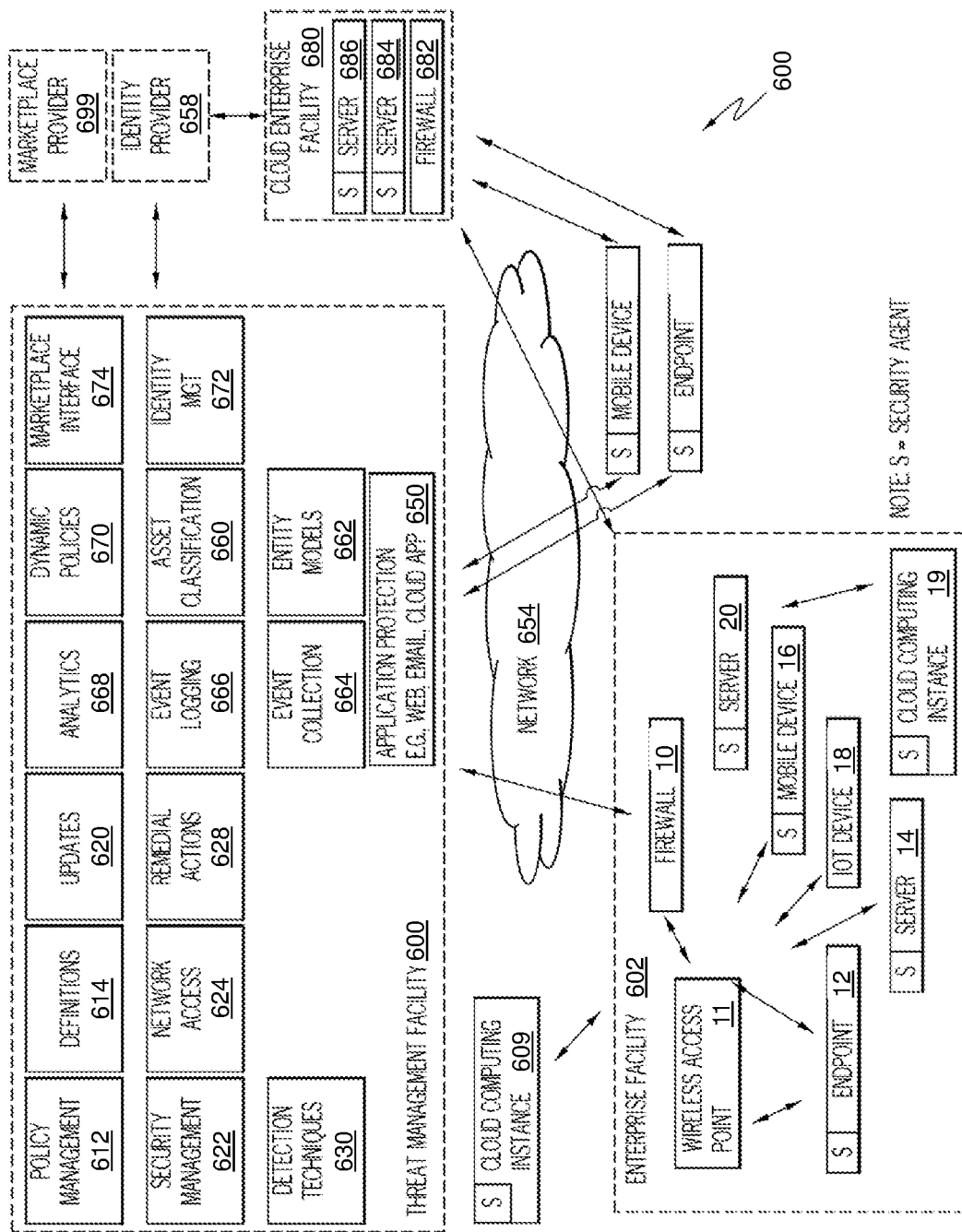
FIG. 6 depicts a block diagram of a threat management facility, in accordance with an example embodiment.

The security system 270 may be part of a security agent running on an endpoint such as the computing device 200, for example, a security agent (S) in an endpoint 12 of FIG. 6. The security system 270 is constructed and arranged to protect applications from malicious attacks, e.g., processes and/or DLL files running on the computing device 200. In doing so, the security system 270 can detect malicious attacks on other software components 220, 230, 250 of the computing device 200.

The network interface 216 may include any hardware and/or software for connecting the computing device 200 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or communications through any other media that might be used to carry data between the computing device 200 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 200 to other computing or communications resources. By way of example and not limitation, this may include electronics for a wired or wireless Ethernet connection operating according to the IEEE 802.11 standard (or any variation thereof), or any other short- or long-range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, 5G, or any other suitable protocol or combination of protocols). The network interface 216 may be included as part of the input/output devices 220 or vice versa.

The input/output (I/O) interface 206 may support input from and output to other devices that might couple to the computing device 200. This may, for example, include serial ports, universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices.

A bus 232 or combination of buses may serve as an electromechanical platform for interconnecting components of the computing device 200 such as the processor 202, memory 204, network interface 216, and I/O interface 206.

During a computer program launch, the processor 202 loads files 250 into user mode processes and in doing so reads programs and data stored in the memory 204. Embodiments of the present inventive concept permit the security system 270, or more specifically, a malware scanner or the like of the security operation module 278, to concurrently monitor the corresponding processes for malicious activity without blocking read operations. To prevent the execution of processes containing malware, the event handler 274 of the security system 270 can block the threads of a created process from performing a write operation or the like during a DLL load event. The event handler 274 can include a detection mechanism that facilitates loading of DLL files early in the boot process. In this manner, read and load events are permitted and blocking stages are performed at later events. The classification module 272 can classify the processes for execution during the program launch, for example, according to a method described herein.

Figure 3:
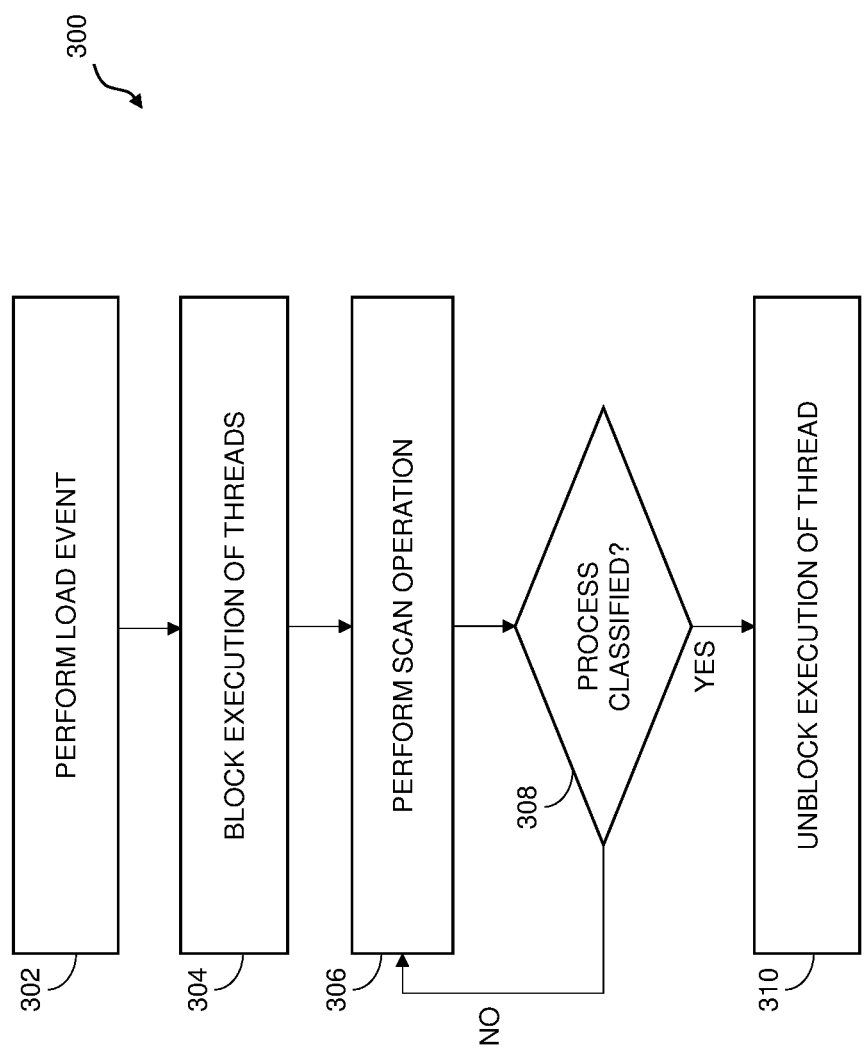
FIG. 3 depicts a method for managing processes in a software scan operation, in accordance with an example embodiment.

FIG. 3 depicts a method 300 for managing processes in a software scan operation, in accordance with an example embodiment. In describing the method 300, reference is made to elements of FIGS. 1 and 2. For example, at least some of the method 300 can be implemented by the computing device 200 of FIG. 2.

At block 302, a load event is performed. The load event can include the loading of a file 250 in the computer memory 204 during a read operation. In some embodiments, the file 250 can be loaded by an application 230, or more specifically, a process or thread. New threads of a computer program can be created for a process related to the load event of block 302. For example, a read event can be generated when a client sends data to a server, which can guarantee that data can be read from a specified client without causing a current thread to enter a blocked state.

At block 304, the execution of the threads can be blocked by the event handler 274 until the DLL files of interest are loaded. A process thread can be executed until it attempts to perform a write, access a network device, or other external interaction whereby the process thread is prevented, or blocked, from performing such an external interaction. In some embodiments, the process thread is temporarily blocked or delayed until the process is classified, at which the thread is unblocked (block 310). In some embodiments, when a new process starts, a process creation event may include information such as the time, process name, parent process, and so on. This information may be used for malware detection, for example, used for logging malicious activity.

At block 306, a scan operation can be performed on the file 250, for example, to identify potentially malicious software, or non-malicious software capable of performing a malicious activity. Since the execution of the thread(s) of the process is blocked, sufficient time is provided for the security agent to complete the scan operation. In some embodiments, the scan operation is a malware scan operation initiated by a malware scanner of the security operations module 278 of the security system 270, for example, malware tracing and the like. The scan operation can confirm suspected malware with respect to the subsequent generation of events related to a process of interest. The scan operation can scan the processes that load files, e.g., DLLs. The security system 270 may perform a scan operation that includes a presentation of a list of files loaded by processes. However, processing control can return to the executable immediately after the start of the scan operation so the processing of a DLL, script, or other application-related files may continue.

In addition, the processing control is returned in a manner that prevents the occurrence of a breakout where malware at a network socket can access computer resources, such as a file system, network interfaces, and so on. This breach may permit malware to gain access to the file.

Accordingly, at decision diamond 308, a determination is made whether the process is classified. For example, information on a new process can be obtained, since the read and load events can occur. If yes, then the method 300 proceeds to block 310, where the thread is unblocked and can proceed with performing a write or the like. If no, then the method 300 returns to block 306 where the scan operation continues until completion.

Accordingly, the method 300 does not require a computing device 200 to wait until a malware scan operation is performed before a read or load event occurs. A load operation can be performed, and corresponding processes may be executed, but are blocked from write operations or the like at later events, i.e., permitting read, load, and block events to occur asynchronously.

Figure 4:
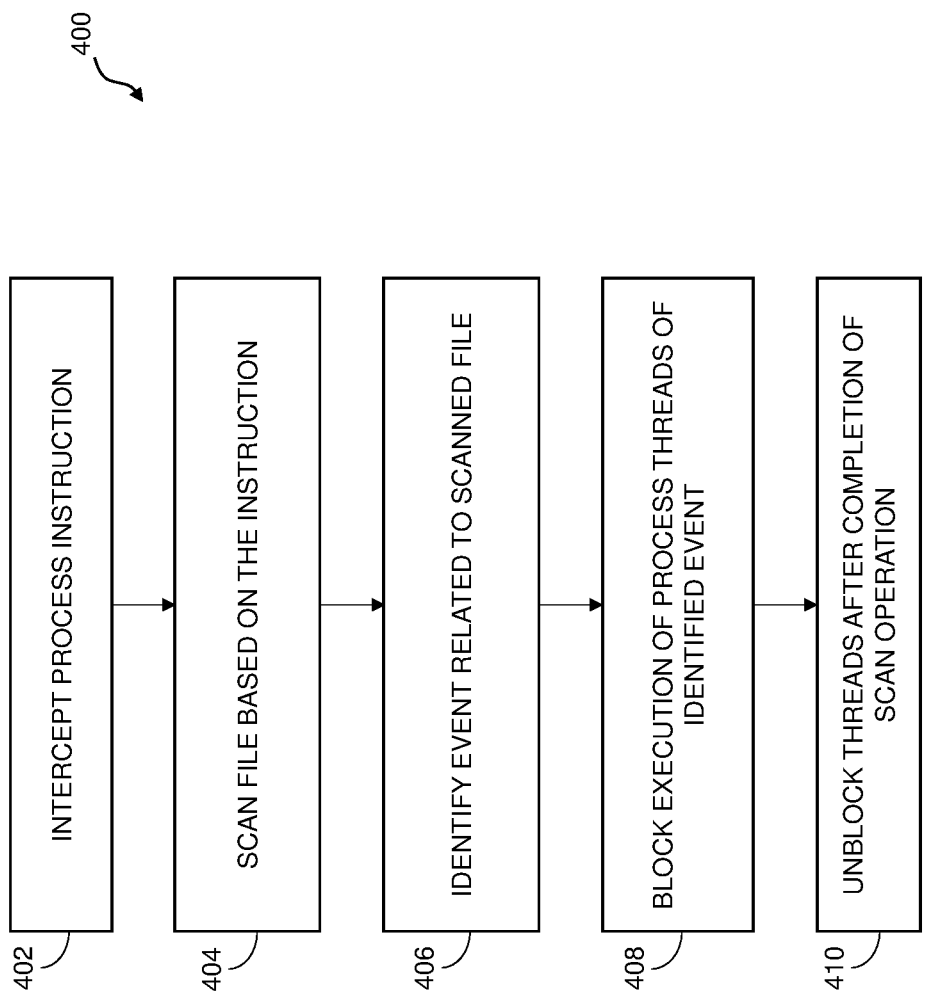
FIG. 4 depicts a method for performing a security operation to identify potentially malicious activity in a computer memory, in accordance with an example embodiment.

FIG. 4 depicts a method 400 for performing a security operation to identify potentially malicious activity in a computer memory, in accordance with an example embodiment. In describing the method 400, reference may be made to elements of FIG. 2. For example, at least some of the method 400 can be implemented by the computing device 200 of FIG. 2.

At block 402, the intercept point generator 276 of the security system 270 can intercept code of an application, for example, which may include potentially malicious software. The computer process may be based on a load-related event that occurs during a read operation, for example, generating threads for loading a file 250 in the computer memory 204. In some embodiments, the file may be configured to include a plurality or intercept points, or hooks, for detecting events of interest occurring within the executable.

At block 404, the file 250 is scanned based on the interception of the instruction of block 402. In particular, the intercept points can be used for detecting events of interest occurring within the executable. For example, the intercept points may intercept an anomalous data request by an executable during or after loading of a DLL by the executable file.

At block 406, an event is identified that indicates possible malware. For example, the use of the data request may be considered malicious activity, which can be intercepted by the intercept point generator 276 of the security system 270.

At block 408, the execution of process threads of the identified event is blocked. For example, the execution of a thread pertaining to the interpreter interpreting content of a script under analysis by a scan operation, is halted or suspended until the intercepted data request is returned, in particular, immediately after a start of a scan operation. Blocking the execution of the threads may include inactivating or terminating the at least one thread of the process in response to detecting, during the scanning of the computer process, the potentially malicious software.

At block 410, the threads are unblocked after a completion of the scan operation. In some embodiments, a plurality of scan operations is performed on the file and a decision can be made to unblock the execution of the threads, or to take another action such as performing a memory dump, segregating code related to the file, and so on. In other embodiments, the process is either un-delayed on completion of the previous security operation or other security operations performed on that process.

Figure 5:
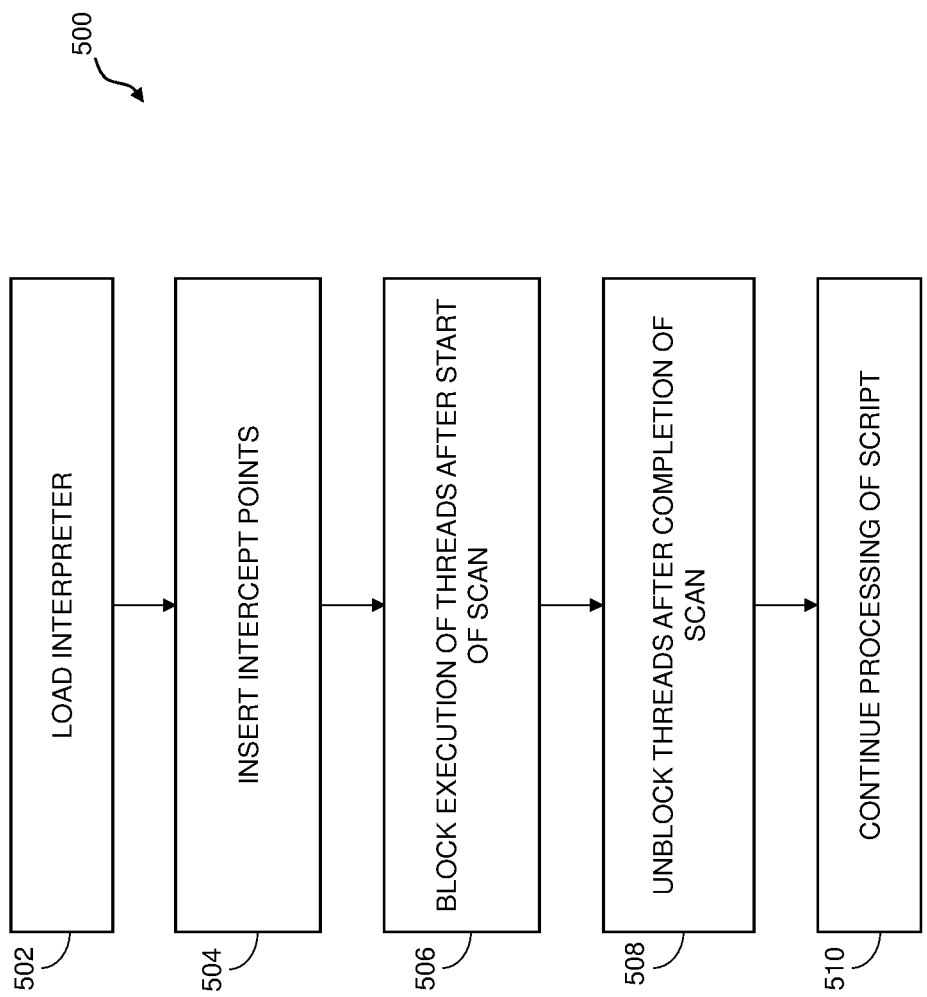
FIG. 5 depicts a method for asynchronous processing of events of a script interpreter, in accordance with an example embodiment.

FIG. 5 depicts a method 500 for asynchronous processing of events of a script interpreter, in accordance with an example embodiment. In describing the method 500, reference may be made to the computing device 200 of FIG. 2.

At block 502, during the launch of an application 230, an interpreter 220 is loaded into a program.

At block 504, in response to the loading of the interpreter 220, a plurality of intercept points is inserted into the program code related to the interpreter. This permits processes executing a script to be intercepted, for example, to detect possible malicious activity performed by the process associated with the interpreter 220.

At block 506, a scan operation is initiated. Process threads are generated to allow the load event to occur but are blocked from execution, for example, as described in FIGS. 3 and 4. The system can return control immediately after the start of the scan operation.

At block 508, the threads are unblocked after completion of the scan operation.

At block 510, the monitoring of the read and load events regarding the interpreter 220 permit the system to classify the process. The process can be classified by the object(s), e.g., DLLs or the like, loaded into the process. In this example, the process is recognized as being configured to execute scripts, and therefore, the process can be identified as part of an interpreter.

FIG. 6 depicts a block diagram of a threat management facility 600 providing protection against a plurality of threats, such as malware, viruses, spyware, cryptoware, adware, Trojans, spam, intrusion, policy abuse, improper configuration, vulnerabilities, improper access, uncontrolled access, code injection attacks and more according to an example embodiment. The threat management facility 600 may communicate with, coordinate, and control operation of security functionality at different control points, layers, and levels within the facility 600. A number of capabilities may be provided by the threat management facility 600, with an overall goal to intelligently use the breadth and depth of information that is available about the operation and activity of compute instances and networks as well as a variety of available controls. Another overall goal is to provide protection needed by an organization that is dynamic and able to adapt to changes in compute instances and new threats or unwanted activity. In embodiments, the threat management facility 600 may provide protection from a variety of threats or unwanted activity to an enterprise facility that may include a variety of compute instances in a variety of locations and network configurations.

Just as one example, users of the threat management facility 600 may define and enforce policies that control access to and use of compute instances, networks and data. Administrators may update policies such as by designating authorized users and conditions for use and access. The threat management facility 600 may update and enforce those policies at various levels of control that are available, such as by directing compute instances to control the network traffic that is allowed to traverse firewalls and wireless access points, applications and data available from servers, applications and data permitted to be accessed by endpoints, and network resources and data permitted to be run and used by endpoints. The threat management facility 600 may provide many different services, and policy management may be offered as one of the services.

Turning to a description of certain capabilities and components of the threat management facility 600, an exemplary enterprise facility 602 may be or may include any networked computer-based infrastructure. For example, the enterprise facility 602 may be corporate, commercial, organizational, educational, governmental, or the like. As home networks get more complicated and include more compute instances at home and in the cloud, an enterprise facility 602 may also or instead include a personal network such as a home or a group of homes. The enterprise facility's 602 computer network may be distributed amongst a plurality of physical premises such as buildings on a campus, and located in one or in a plurality of geographical locations. The configuration of the enterprise facility as shown is merely exemplary, and it will be understood that there may be any number of compute instances, less or more of each type of compute instance, and other types of compute instances. As shown, the exemplary enterprise facility includes a firewall 10, a wireless access point 11, an endpoint 12, a server 14, a mobile device 16, an appliance or IOT device 18, a cloud computing instance 19, and a server 20. Again, the compute instances 10-20 depicted are exemplary, and there may be any number or type of compute instances 10-20 in a given enterprise facility. For example, in addition to the elements depicted in the enterprise facility 602, there may be one or more gateways, bridges, wired networks, wireless networks, virtual private networks, other compute instances, and so on.

The threat management facility 600 may include certain facilities, such as a policy management facility 612, security management facility 622, update facility 620, definitions facility 614, network access rules facility 624, remedial action facility 628, detection techniques facility 630, application protection facility 650, asset classification facility 660, entity model facility 662, event collection facility 664, event logging facility 666, analytics facility 668, dynamic policies facility 670, identity management facility 672, and marketplace management facility 674, as well as other facilities. For example, there may be a testing facility, a threat research facility, and other facilities. It should be understood that the threat management facility 600 may be implemented in whole or in part on a number of different compute instances, with some parts of the threat management facility on different compute instances in different locations. For example, some or all of one or more of the various facilities 600, 612-674 may be provided as part of a security agent S that is included in software running on a compute instance 10-26 within the enterprise facility. Some or all of one or more of the facilities 600, 612-674 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 609.

In embodiments, a marketplace provider 699 may make available one or more additional facilities to the enterprise facility 602 via the threat management facility 600. The marketplace provider may communicate with the threat management facility 600 via the marketplace interface facility 674 to provide additional functionality or capabilities to the threat management facility 600 and compute instances 10-26. A marketplace provider 699 may be selected from a number of providers in a marketplace of providers that are available for integration or collaboration via the marketplace interface facility 674. A given marketplace provider 699 may use the marketplace interface facility 674 even if not engaged or enabled from or in a marketplace. As non-limiting examples, the marketplace provider 699 may be a third-party information provider, such as a physical security event provider; the marketplace provider 699 may be a system provider, such as a human resources system provider or a fraud detection system provider; the marketplace provider 699 may be a specialized analytics provider; and so on. The marketplace provider 699, with appropriate permissions and authorization, may receive and send events, observations, inferences, controls, convictions, policy violations, or other information to the threat management facility. For example, the marketplace provider 699 may subscribe to and receive certain events, and in response, based on the received events and other events available to the marketplace provider 699, send inferences to the marketplace interface, and in turn to the analytics facility 668, which in turn may be used by the security management facility 622.

The identity provider 658 may be any remote identity management system or the like configured to communicate with an identity management facility 672, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

In embodiments, the identity provider 658 may provide user identity information, such as multi-factor authentication, to a SaaS application. Centralized identity providers such as Microsoft Azure, may be used by an enterprise facility instead of maintaining separate identity information for each application or group of applications, and as a centralized point for integrating multifactor authentication. In embodiments, the identity management facility 672 may communicate hygiene, or security risk information, to the identity provider 658. The identity management facility 672 may determine a risk score for a user based on the events, observations, and inferences about that user and the compute instances associated with the user. If a user is perceived as risky, the identity management facility 672 can inform the identity provider 658, and the identity provider 658 may take steps to address the potential risk, such as to confirm the identity of the user, confirm that the user has approved the SaaS application access, remediate the user's system, or such other steps as may be useful.

In embodiments, threat protection provided by the threat management facility 600 may extend beyond the network boundaries of the enterprise facility 602 to include clients (or client facilities) such as an endpoint 22 outside the enterprise facility 602, a mobile device 26, a cloud computing instance 609, or any other devices, services or the like that use network connectivity not directly associated with or controlled by the enterprise facility 602, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 602 network, such as when compute instances 22, 26 use a network that is outside of the enterprise facility 602 and separated from the enterprise facility 602, e.g., by a gateway, a public network, and so forth.

In some implementations, compute instances 10-26 may communicate with a cloud enterprise facility 680. The cloud enterprise facility may include one or more cloud applications, such as a SaaS application, which is used by but not operated by the enterprise facility 602. Exemplary commercially available SaaS applications include Salesforce, Amazon Web Services (AWS) applications, Google Apps applications, Microsoft Office 365 applications and so on. A given SaaS application may communicate with an identity provider 658 to verify user identity consistent with the requirements of the enterprise facility 602. The compute instances 10-26 may communicate with an unprotected server (not shown) such as a web site or a third-party application through an internetwork 654 such as the Internet or any other public network, private network or combination of these.

The cloud enterprise facility 680 may include servers 684, 686, and a firewall 682. The servers 684, 686 on the cloud enterprise facility 680 may run one or more enterprise or cloud applications, such as SaaS applications, and make them available to the enterprise facilities 602 compute instances 10-26. It should be understood that there may be any number of servers 684, 686 and firewalls 682, as well as other compute instances in a given cloud enterprise facility 680. It also should be understood that a given enterprise facility may use both SaaS applications and cloud enterprise facilities 680, or, for example, a SaaS application may be deployed on a cloud enterprise facility 680.

In embodiments, aspects of the threat management facility 600 may be provided as a stand-alone solution. In other embodiments, aspects of the threat management facility 600 may be integrated into a third-party product. An application programming interface (e.g., a source code interface) may be provided such that aspects of the threat management facility 600 may be integrated into or used by or with other applications. For instance, the threat management facility 600 may be stand-alone in that it provides direct threat protection to an enterprise or computer resource, where protection is subscribed to directly. Alternatively, the threat management facility may offer protection indirectly, through a third-party product, where an enterprise may subscribe to services through the third-party product, and threat protection to the enterprise may be provided by the threat management facility 600 through the third-party product.

The security management facility 622 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 622 may provide malicious code protection to a compute instance. The security management facility 622 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In embodiments, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 650 provided by the cloud, and so on.

In an embodiment, the security management facility 622 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 650 provided by the cloud, and so on.

In an embodiment, security management facility 622 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 650 provided by the cloud, and so on.

In an embodiment, the security management facility 622 may provide for network access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. In embodiments, a VPN may be treated in the same manner as a physical network. Aspects of network access control may be provided, for example, in the security agent of an endpoint 12, in a wireless access point 11 or firewall 10, as part of application protection 650 provided by the cloud, e.g., from the threat management facility 600 or other network resource(s).

In an embodiment, the security management facility 622 may provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 650 provided by the cloud, and so on.

In an embodiment, the security management facility 622 may provide for reputation filtering, which may target or identify sources of known malware. For instance, reputation filtering may include lists of URIs of known sources of malware or known suspicious IP addresses, code authors, code signers, or domains, that when detected may invoke an action by the threat management facility 600. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 650 provided by the cloud, and so on. In embodiments, some reputation information may be stored on a compute instance 10-26, and other reputation data available through cloud lookups to an application protection lookup database, such as may be provided by application protection 650.

In embodiments, information may be sent from the enterprise facility 602 to a third party, such as a security vendor, or the like, which may lead to improved performance of the threat management facility 600. In general, feedback may be useful for any aspect of threat detection. For example, the types, times, and number of virus interactions that an enterprise facility 602 experiences may provide useful information for the prevention of future virus threats. Feedback may also be associated with behaviors of individuals within the enterprise, such as being associated with most common violations of policy, network access, unauthorized application loading, unauthorized external device use, and the like. In embodiments, feedback may enable the evaluation or profiling of client actions that are violations of policy that may provide a predictive model for the improvement of enterprise policies.

An update management facility 620 may provide control over when updates are performed. The updates may be automatically transmitted, manually transmitted, or some combination of these. Updates may include software, definitions, reputations or other code or data that may be useful to the various facilities. For example, the update facility 620 may manage receiving updates from a provider, distribution of updates to enterprise facility 602 networks and compute instances, or the like. In embodiments, updates may be provided to the enterprise facility's 602 network, where one or more compute instances on the enterprise facility's 602 network may distribute updates to other compute instances.

The threat management facility 600 may include a policy management facility 612 that manages rules or policies for the enterprise facility 602. Exemplary rules include access permissions associated with networks, applications, compute instances, users, content, data, and the like. The policy management facility 612 may use a database, a text file, other data store, or a combination to store policies. In an embodiment, a policy database may include a block list, a blacklist, an allowed list, a white list, and more. As a few non-limiting examples, policies may include a list of enterprise facility 602 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 622 may access the rules within a policy facility to determine if the requested access is related to a sporting website.

The policy management facility 612 may include access rules and policies that are distributed to maintain control of access by the compute instances 10-26 to network resources. Exemplary policies may be defined for an enterprise facility, application type, subset of application capabilities, organization hierarchy, compute instance type, user type, network location, time of day, connection type, or any other suitable definition. Policies may be maintained through the threat management facility 600, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In an embodiment, the policy management facility 612 may be a stand-alone application, may be part of the network server facility 642, may be part of the enterprise facility 602 network, may be part of the client facility, or any suitable combination of these.

The policy management facility 612 may include dynamic policies that use contextual or other information to make security decisions. As described herein, the dynamic policies facility 670 may generate policies dynamically based on observations and inferences made by the analytics facility. The dynamic policies generated by the dynamic policy facility 670 may be provided by the policy management facility 612 to the security management facility 622 for enforcement.

In embodiments, the threat management facility 600 may provide configuration management as an aspect of the policy management facility 612, the security management facility 622, or some combination. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 612 may require a configuration that turns off USB drive access via a registry key of a compute instance. Aspects of configuration management may be provided, for example, in the security agent of an endpoint 12, in a wireless access point 11 or firewall 10, as part of application protection 650 provided by the cloud, or any combination of these.

In embodiments, the threat management facility 600 may also provide for the isolation or removal of certain applications that are not desired or may interfere with the operation of a compute instance 10-26 or the threat management facility 600, even if such application is not malware per se. The operation of such products may be considered a configuration violation. The removal of such products may be initiated automatically whenever such products are detected, or access to data and network resources may be restricted when they are installed and running. In the case where such applications are services which are provided indirectly through a third-party product, the applicable application or processes may be suspended until action is taken to remove or disable the third-party product.

The policy management facility 612 may also require update management (e.g., as provided by the update facility 620). Update management for the security facility 622 and policy management facility 612 may be provided directly by the threat management facility 600, or, for example, by a hosted system. In embodiments, the threat management facility 600 may also provide for patch management, where a patch may be an update to an operating system, an application, a system tool, or the like, where one of the reasons for the patch is to reduce vulnerability to threats.

In embodiments, the security facility 622 and policy management facility 612 may push information to the enterprise facility 602 network and/or the compute instances 10-26, the enterprise facility 602 network and/or compute instances 10-26 may pull information from the security facility 622 and policy management facility 612, or there may be a combination of pushing and pulling of information. For example, the enterprise facility 602 network and/or compute instances 10-26 may pull update information from the security facility 622 and policy management facility 612 via the update facility 620, an update request may be based on a time period, by a certain time, by a date, on demand, or the like. In another example, the security facility 622 and policy management facility 612 may push the information to the enterprise facility's 602 network and/or compute instances 10-26 by providing notification that there are updates available for download and/or transmitting the information. In an embodiment, the policy management facility 612 and the security facility 622 may work in concert with the update management facility 620 to provide information to the enterprise facility's 602 network and/or compute instances 10-26. In various embodiments, policy updates, security updates and other updates may be provided by the same or different modules, which may be the same or separate from a security agent running on one of the compute instances 10-26.

As threats are identified and characterized, the definition facility 614 of the threat management facility 600 may manage definitions used to detect and remediate threats. For example, identity definitions may be used for scanning files, applications, data streams, etc. for the determination of malicious code. Identity definitions may include instructions and data that can be parsed and acted upon for recognizing features of known or potentially malicious code. Definitions also may include, for example, code or data to be used in a classifier, such as a neural network or other classifier that may be trained using machine learning. Updated code or data may be used by the classifier to classify threats. In embodiments, the threat management facility 600 and the compute instances 10-26 may be provided with new definitions periodically to include most recent threats. Updating of definitions may be managed by the update facility 620, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 600 in light of continuous generation of new or evolved forms of malware. Threat research may be provided by researchers and analysts working on known threats, in the form of policies, definitions, remedial actions, and so on.

The security management facility 622 may scan an outgoing file and verify that the outgoing file is permitted to be transmitted according to policies. By checking outgoing files, the security management facility 622 may be able discover threats that were not detected on one of the compute instances 10-26, or policy violation, such transmittal of information that should not be communicated unencrypted.

The threat management facility 600 may control access to the enterprise facility 602 networks. A network access facility 624 may restrict access to certain applications, networks, files, printers, servers, databases, and so on. In addition, the network access facility 624 may restrict user access under certain conditions, such as the user's location, usage history, need to know, job position, connection type, time of day, method of authentication, client-system configuration, or the like. Network access policies may be provided by the policy management facility 612, and may be developed by the enterprise facility 602, or pre-packaged by a supplier. Network access facility 624 may determine if a given compute instance 10-22 should be granted access to a requested network location, e.g., inside or outside of the enterprise facility 602. Network access facility 624 may determine if a compute instance 22, 26 such as a device outside the enterprise facility 602 may access the enterprise facility 602. For example, in some cases, the policies may require that when certain policy violations are detected, certain network access is denied. The network access facility 624 may communicate remedial actions that are necessary or helpful to bring a device back into compliance with policy as described below with respect to the remedial action facility 628. Aspects of the network access facility 624 may be provided, for example, in the security agent of the endpoint 12, in a wireless access point 11, in a firewall 10, as part of application protection 650 provided by the cloud, and so on.

In an embodiment, the network access facility 624 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 624 may use rule evaluation to parse network access requests and apply policies. The network access rule facility 624 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 600 may include an asset classification facility 660. The asset classification facility will discover the assets present in the enterprise facility 602. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 662. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 664 may be used to collect events from any of a wide variety of sensors that may provide relevant events from an asset, such as sensors on any of the compute instances 10-26, the application protection facility 650, a cloud computing instance 609 and so on. The events that may be collected may be determined by the entity models. There may be a variety of events collected. Events may include, for example, events generated by the enterprise facility 602 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 609. Events may range in granularity. An exemplary event may be communication of a specific packet over the network. Another exemplary event may be identification of an application that is communicating over a network.

The event logging facility 666 may be used to store events collected by the event collection facility 664. The event logging facility 666 may store collected events so that they can be accessed and analyzed by the analytics facility 668. Some events may be collected locally, and some events may be communicated to an event store in a central location or cloud facility. Events may be logged in any suitable format.

Events collected by the event logging facility 666 may be used by the analytics facility 668 to make inferences and observations about the events. These observations and inferences may be used as part of policies enforced by the security management facility Observations or inferences about events may also be logged by the event logging facility 666.

When a threat or other policy violation is detected by the security management facility 622, the remedial action facility 628 may be used to remediate the threat. Remedial action may take a variety of forms, non-limiting examples including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 622 may take any steps or deploy any measures suitable for addressing a detection of a threat, potential threat, policy violation or other event, code or activity that might compromise security of a computing instance 10-26 or the enterprise facility 602.

While the above description of the threat management facility 600 describes various threats typically coming from a source outside the enterprise facility 602, it should be understood that the disclosed embodiments contemplate that threats may occur to the enterprise facility 602 by the direct actions, either intentional or unintentional, of a user or employee associated with the enterprise facility 602. Thus, reference to threats hereinabove may also refer to instances where a user or employee, either knowingly or unknowingly, performs data exfiltration from the enterprise facility 602 in a manner that the enterprise facility 602 wishes to prevent.

It will be appreciated that the modules, processes, systems, and sections described above may be implemented in hardware, hardware programmed by software, software instructions stored on a nontransitory computer readable medium or a combination of the above. A system as described above, for example, may include a processor configured to execute a sequence of programmed instructions stored on a nontransitory computer readable medium. For example, the processor may include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions may be compiled from source code instructions provided in accordance with a programming language such as Java, C, C++, C#.net, assembly or the like. The instructions may also comprise code and data objects provided in accordance with, for example, the Visual Basic™ language, or another structured or object-oriented programming language. The sequence of programmed instructions, or programmable logic device configuration software, and data associated therewith may be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes, systems, and sections may be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above may be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein may be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that may be used on a variety of computer platforms. Alternatively, embodiments of the disclosed method, system, and computer program product may be implemented partially or fully in hardware using, for example, standard logic circuits or a VLSI design. Other hardware or software may be used to implement embodiments depending on the speed and/or efficiency requirements of the systems, the particular function, and/or particular software or hardware system, microprocessor, or microcomputer being utilized. Embodiments of the method, system, and computer program product may be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) may be implemented in software executed on a programmed general-purpose computer, a special purpose computer, a microprocessor, a network server or switch, or the like.

It is, therefore, apparent that there is provided, in accordance with the various embodiments disclosed herein, methods, systems and computer readable media for applying an appropriate security policy to network traffic to prevent intrusion attempts to the containerized computing environment.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter. It should also be understood that references to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

The invention claimed is:

1. A method for processing computer system events for software security operations, comprising:
   loading, by a computer process based on a first event occurring during a process initiation operation, at least one file in a computer memory;
   generating at least one thread of the computer process;
   blocking, based on a second event occurring after the first event, the at least one thread of the computer process from performing a write operation during the loading of the at least one file in the computer memory;
   performing a security operation on the process contemporaneously with the loading of the at least one file in the computer memory and the blocking of the at least one thread of the computer process from performing the write operation; and
   unblocking the at least one thread after performing the security operation.

2. The method of claim 1, wherein performing the security operation on the computer process includes:
   scanning the at least one file and identifying the at least one file loaded by the computer process, and
   classifying the computer process in response to identifying the at least one file.

3. The method of claim 1, wherein performing the security operation of the process includes:
  intercepting at least one instruction associated with the computer process that includes potentially malicious software or non-malicious software intended for a malicious operation; and
  preventing the at least one thread from performing a first write, network, or external device access operation during the scanning for the potentially malicious software or non-malicious software without blocking read operations.

4. The method of claim 1, wherein in response to blocking the at least one thread of the computer process from performing the write operation, the computer process is scanned and other files loaded in the computer memory requiring a read operation are identified.

5. The method of claim 1, further comprising in response to loading by the computer process of the at least one file in the computer memory, the computer process is classified to determine a feature of the computer process.

6. The method of claim 5, further comprising preventing the computer process from performing a write, network, or external device access operation until the computer process is classified as an externally interacting operation.

7. The method of claim 1, further comprising:
  scanning the at least one file to determine that the computer process is configured to execute scripts in response to determining that an interpreter is loaded by an executable code.

8. A computer system, comprising:
  one or more memory devices coupled to the one or more processors storing program code executable by the one or more processors; and
  one or more processors that, having executed the program code, configure the computer system to perform a plurality of operations comprising:
    loading, by a computer process based on a first event occurring during a process initiation operation, at least one file in the computer memory;
    generating at least one thread of the computer process;
    blocking, based on a second event occurring after the first event, the at least one thread of the computer process from performing a write operation during the loading of the at least one file in the computer memory;
    performing a security operation on the process contemporaneously with the loading of the at least one file in the computer memory and the blocking of the at least one thread of the computer process from performing the write operation, and
    unblocking the at least one thread after performing the security operation.

9. The computer system of claim 8, wherein performing the security operation on the computer process includes:
  scanning the at least one file and identifying the at least one file loaded by the computer process; and
  classifying the computer process in response to identifying the at least one file.

10. The computer system of claim 8, wherein performing the security operation of the process includes:
  intercepting at least one instruction associated with the computer process that includes potentially malicious software or non-malicious software intended for a malicious operation; and
  preventing the at least one thread from performing a first write, network, or external device access operation during the scanning for the potentially malicious software or non-malicious software without blocking read operations.

11. The computer system of claim 8, wherein in response to blocking the at least one thread of the computer process during the loading the at least one file, the computer process is scanned and other files loaded in the computer memory requiring a read operation are identified.

12. The computer system of claim 8, further comprising in response to loading by the computer process of the at least one file in the computer memory, the computer process is classified to determine a feature of the computer process.

13. The computer system of claim 8, further comprising preventing the computer process from performing a write, network, or external device access operation until the computer process is classified as an externally interacting operation.

14. The computer system of claim 8, wherein the plurality of operations further comprises:
  scanning the at least one file to determine that the computer process is configured to execute scripts in response to determining that an interpreter is loaded by an executable code.

15. A computer program product for processing computer network traffic, the computer program product comprising computer-readable program code executable by one or more processors of a computer system to cause the computer system to perform a plurality of operations comprising:
  loading, by a computer process based on a first event occurring during a process initiation operation, at least one file in a computer memory;
  generating at least one thread of the computer process;
  blocking, based on a second event occurring after the first event, the at least one thread of the computer process from performing a write operation during the loading of the at least one file in the computer memory;
  performing a security operation on the process contemporaneously with the loading of the at least one file in the computer memory and the blocking of the at least one thread of the computer process from performing the write operation; and
  unblocking the at least one thread after performing the security operation.

16. The computer program product of claim 15, wherein performing the security operation on the computer process includes:
  scanning the at least one file and identifying the at least one file loaded by the computer process; and
  classifying the computer process in response to identifying the at least one file.

17. The computer program product of claim 15, wherein performing the security operation of the process includes:
  intercepting at least one instruction associated with the computer process that includes potentially malicious software or non-malicious software intended for a malicious operation;
  scanning the computer process based on the intercepting of the at least one instruction;
  preventing the at least one thread from performing a first write, network, or external device access operation during the scanning for the potentially malicious software or non-malicious software without blocking read operations.

18. The computer program product of claim 15, wherein in response to blocking the at least one thread of the computer process from performing the write operation, the computer process is scanned, and other files loaded in the computer memory requiring a read operation are identified.

19. The computer program product of claim 15, further comprising in response to loading by the computer process of the at least one file in the computer memory, the computer process is classified to determine a feature of the computer process.

20. The computer program product of claim 15, wherein the plurality of operations further comprises:
   scanning the at least one file to determine that the computer process is configured to execute scripts in response to determining that an interpreter is loaded by an executable code.

\* \* \* \* \*